Sept. 27, 1966  J. A. GLASSMAN  3,275,519
PERORAL PELLET AND THE METHOD OF MAKING SAME
Filed Oct. 1, 1965
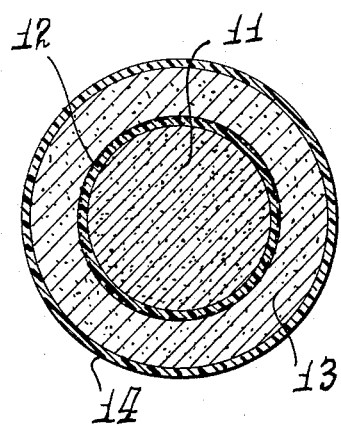
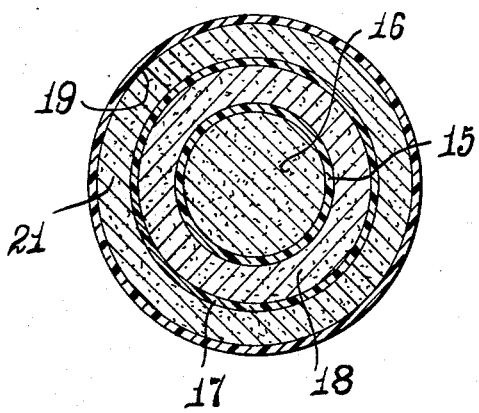
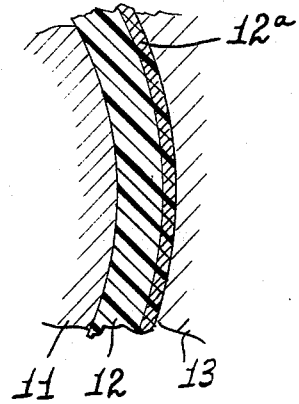
INVENTOR
Jacob A Glassman
BY
Elmer L. Quickel
Attorney United States Patent Office 3,275,519
Patented Sept. 27, 1966

3,275,519
PERORAL PELLET AND THE METHOD OF MAKING SAME
Jacob A. Glassman, 1680 Meridian Ave., Miami Beach, Fla.
Filed Oct. 1, 1965, Ser. No. 492,227
14 Claims. (Cl. 167—82)

This application is a continuation-in-part of my co-pending application Serial No. 232,102, filed October 22, 1962, now U.S. Patent No. 3,228,789.

The present invention relates to improvements in medicinal pellets and to the process of making same and is more particularly concerned with pellets and the like processed in such manner as to critically control the rate of solubility of the pellet or selected parts thereof to obtain critical delayed or timed release of medicaments in the stomach, in the duodenum, jejunum and/or ileum, or at any preselected absorptive level of the intestinal tract.

A standard method of dispensing medicaments in dosage form involves the administering of such medicaments in pellet form, either coated or uncoated with a gelatin-glycerin outer shell. It has been established that the gelatin coating in its pure state is digested by the stomach juices thus liberating all the medicaments at the same time and at the same site.

Various unsuccessful attempts have been made to overcome this objectionable characteristic of pure gelatin coatings including exposing the gelatin coating or shell to an atmosphere of formaldehyde gas; immersing same into a formaldehyde-alcohol solution and then air drying or washing in water. However, it has been found that because gelatin is soluble in water and small quantities of water are contained in the formaldehyde-alcohol solution, absolute dehydration and critical fixation or neutralization of the formaldehyde during air drying is impossible to attain.

Exposure of gelatin to concentrations of formaldehyde gas for the intended purpose of making it acid resistant has resulted also in undesirable changes, such as complete insolubility, especially after standing one, two or more weeks. The reason for this is that formaldehyde gas has an almost instantaneous chemical reaction with gelatin which does not stop despite air drying or washing; the chemical reaction continues until the gelatin is rendered completely insoluble throughout its entire thickness. This arises from the fact that a complete chemical interreaction takes place between the amino-groups of the gelatin protein and the formaldehyde with the creation of a new chemical substance having unwanted characteristics, namely, reduced water swelling properties and complete insolubility. These undesirable characteristics have been repeatedly experienced even though the aqueous formalin concentrations were reduced from 40% to as low as 1%.

Other known efforts to effect time delay release of medicaments administered in pellet form have also been disappointing and ineffective. For example, in one known instance pellets have been compounded of a mixture of nontime-delay and time-delay medicaments in granular form to provide different time release for each group in an attempt to maintain continuously a desired therapeutic level. The admixture in pellet form of incompatible granular substances is not possible in such instances. Also, such granular containing pellets are ineffective for time controlled medication at different digestive levels owing to the disintegration of the pellet and chemical alteration of and release of all granules in the stomach. Upon such disintegration, the time-delay granules are separated one from the other and each must find its way out of the stomach and into the intestinal tract where they are separately broken down and finally absorbed at different levels but in varying unpredictable amounts. In a great many instances they are altered by chemical interaction by the HCL and/or peptic enzymatic action in the stomach before passing therefrom. In either event, only a nonpredictable portion of the intended time-delay granules are effectively released in the intestinal tract, while another portion is eliminated, unabsorbed and possibly even unchanged, offering little or no therapeutic effect. These shortcomings have made such pellets unpredictable, too costly and totally unsatisfactory.

The present controlled use of formalin solutions and a chemical drying agent generates an impenetrable surface by incompletely altering the intrinsic chemistry of the hard gelatin wall in controlled depths so that it resists gastric acidity (low pH), wetness, warmth (37° C.), peristaltic action and enzymatic breakdown.

The present invention has for one of its advantages the provision of a novel method and means to afford time-delay or controlled release of granule or liquid medicaments and in a manner that insures that each medicament is conveyed to the situs intended, chemically unaltered, so as to insure controlled medication at selected levels of the digestive tract.

Applicant has treated an interior gelatin coating or shell of a multimedicament pellet according to the invention so as to make it resistant to the acids of the stomach juices. As a consequence, the exterior part or portion of the pellet will dissolve in the stomach whereas the interior or core portion, which may contain medicament that is compatible or incompatible with the exterior medicament, will pass unchanged into the duodenum or ileum where it is then dissolved to release the medicament therein.

It is therefore an object of the invention to provide a novelly constructed and processed peroral pharmaceutical pellet having one, two or more layers of medicament therein each defined by a gelatin wall each having predetermined critically different dissolution properties through treatment of one or more of such walls with critical concentrations of formalin solution and with alcohol-formalin solutions for critical periods of time and with a chemical dehydrating agent, so that desired layers thereof will be dissolved by specific acid or alkaline chemical reaction at various times and at various levels in the gastro-intestinal tract.

Another object is to provide a pharmaceutical pellet having some or all of its gelatin walls treated with critical weak concentrations of formalin solutions, an alcohol-formalin solution and a chemical drying agent to generate protein changes of predictable depth so that different walls of the pellet have different rates of dissolution during passage of the pellet along the gastro-intestinal tract.

The foregoing and other objects and advantages of the invention will be better understood upon reference to the accompanying drawings in which:

FIG. 1 is a greatly enlarged sectional view of a two-layered pellet treated by the method herein disclosed.

FIG. 2 is a greatly enlarged sectional view of a treated three-layered pellet.

FIG. 3 is an enlarged fragment of the inner treated gelatin wall of the pellet.

The method of gelatin treatment herein disclosed may be practiced by use of equipment such as that shown in my aforesaid copending application Serial No. 232,102, or it may be practiced by any other suitable procedure such as by hand dipping.

In the practice of the within method, as when making a pellet as disclosed, for example, in FIG. 1, a mass of medicament 11, either granular or liquid, is enclosed in a sphere comprised of pure gelatin such as the wall 12.

The gelatin enclosed mass is immersed into an aqueous formaldehyde solution preferably having a concentration that may range from 0.5% to 0.95% by volume. It is immersed in such solution for a period of from 5 to 55 seconds, then withdrawn and allowed to drain whereupon it is immersed for about two minutes in a dehydrating agent such as absolute alcohol (100%) with or without a minute quantity of cupric sulphate to insure removal of all water from the body of absolute alcohol.

This immersion is followed by immersion in a formaldehyde (10% to 20%)-alcohol (70% to 90%) solution for a period of from 20 to 60 seconds whereupon, after draining, it is then immersed momentarily into a second dehydrating agent, such as absolute alcohol, with or without cupric sulphate, for from 2 to 5 minutes and subsequently dried in warm air.

As a dehydrating agent, applicant has used absolute alcohol with or without a small quantity of cupric sulphate added as a dehydrating agent for the alcohol, although other chemical drying agents such as tetrahydrofulfuryl alcohol, butyl alcohol, ether, or acetone have been found to be very effective to insure rapid extraction of all free water from the gelatin wall and rapid removal of all extractable free formaldehyde from the gelatin well.

In the formaldehyde-alcohol solution herein mentioned the formaldehyde concentration may vary from 5% to 15% by volume, but applicant has found that a critically ideal solution has a formaldehyde concentration of about 10% by volume with an alcohol concentration of from 75% to 95%, but preferably about 85%.

The process or steps and solutions generally described above are particularly suited for controlling the chemical reaction of the formaldehyde solution on the gelatin wall. More specifically, the water in a 0.5% formaldehyde solution is necessary to rapidly soften and facilitate or catalyze the chemical penetration of the formaldehyde. The first immersion in the dehydrating agent quickly and effectively extracts the remaining free water and formaldehyde from the gelatin wall so as to immediately stop any further chemical interaction between the formaldehyde and gelatin. The following immersion in the formaldehyde-alcohol solution imparts slowly a further controlled fixation to the gelatin while the second immersion in the dehydrating agent quickly and effectively dries out the last remaining free water and formaldehyde from the gelatin and all further interaction, if any, is totally stopped by then subjecting the gelatin coated pellet core to controlled warm air drying. As a result the gelatin coating on the pellet core is treated in controlled depth, as best illustrated in FIG. 3 at 12a, without the slightest trauma to the gelatin or distortion to the spherical wall.

After the treated pellet core 11–12 has been allowed to dry until hardened, an outer medicament layer 13 in applied and then the final coating or film of gelatin 14 is placed thereover in a conventional manner. This coating 14 preferably is left untreated so as to dissolve in the stomach and release the outer layer of medicament therein. The core portion 11–12 of the pellet will resist stomach acids and becomes the last portion to break up. This will occur in the duodenum or ileum depending upon the degree of treatment to which the gelatin shell 12 has been subjected to. If desired, the outside layer of gelatin 14 may be coated with a layer of sugar or coloring matter.

In the FIG. 2 disclosure, a pellet having three therapeutic layers is shown. Here, for example, the layer 15 of gelatin surrounding the therapeutic core 16, is treated in depth in the aforesaid manner so as to render it resistant to acid and alkaline digestion for a predetermined period of time, as for example, about one hour. The intermediate gelatine layer 17, enclosing a second layer of therapeutic material is treated in depth as aforesaid so as to be resistant to acid and alkaline digestion for a predetermined period of time, as for example, one hour, whereas the outside gelatin layer 19 enclosing a third layer of therapeutic material 21 is left untreated.

It is to be understood that the above recitation of one hour resistance is exemplary only and that the resistant periods may be varied to suit specific requirements, it being only necessary to vary the time during which any specific gelatin layer is subjected to the formalin-alcohol treatment, all as specifically described hereinabove. The structure is such that the outer untreated layer 19 of gelatin is the first to dissolve at a given level in the intestinal tract and release the underlying layer of therapeutic material, followed by dissolution of the intermediate layer of gelatine 17 and release of the underlying layer of therapeutic material, followed by dissolution of the innermost treated gelatine wall 15 at another level in the intestinal tract. Otherwise stated, the recited three compartmented pellet will progressively dissolve at spaced time intervals and at different levels in the intestinal tract. Obviously, a pellet comprised of four or more compartments may be similarly produced by addition of successive layers of therapeutic material each enclosed in a gelatin layer treated to the critical depth.

Of course, a single compartmented pellet may comprise of the core portion only, teated as above described so as to pass through the stomach unchanged for ultimate disintegration in the lower intestinal tract.

Although the invention has been described in detail, it is not desired to limit the invention to the precise disclosure.

I claim:

1. The method of making a therapeutic pellet having an inner therapeutic portion and an outer therapeutic portion, and a layer of gelatin arranged between said portions comprising the successive treating of said gelatin layer with formalin and absolute alcohol to render it resistant to the acid environment of the stomach.

2. The method of making a therapeutic pellet containing a plurality of layers of therapeutic material and having a layer of gelatin between said therapeutic layers, comprising the successive treating of said gelatin layer prior to application of the outer layer of therapeutic material to a .5% aqueous formaldehyde solution, absolute alcohol, a 10% formaldehyde 85% alcohol solution, and absolute alcohol to effect protein changes to a predictable depth and drying.

3. The method recited in claim 2, in which a quantity of cupric sulphate is added to the absolute alcohol.

4. The method recited in claim 2, in which the initial treatment with the aqueous formaldehyde solution is maintained for about from 5 to 55 seconds.

5. The method recited in claim 2, in which the initial treatment with alcohol is maintained for about two minutes.

6. The method recited in claim 2, in which the treatment with formaldehyde-alcohol solution is maintained for from 30 to 60 seconds.

7. The method recited in claim 2, in which the final treatment with absolute alcohol is maintained for from about 2 to 5 minutes.

8. The method recited in claim 2, in which the outer layer of therapeutic material is coated with untreated gelatin.

9. The method of making a multilayered therapeutic pellet having an inner core of medicament material comprising the successive steps of enclosing said core within a shell of gelatin, treating said shell on its surface with a formalin-alcohol solution to render it resistant to the acid environment of the stomach, arranging a layer of medicament material over said shell, enclosing said layer within a shell of gelatin, treating said last named shell on its surface with a formalin-alcohol solution to render it resistant to acid environment of the stomach, placing a second layer of medicament material around said last named gelatin shell, and finally covering said last named layer of medicament material with a layer of untreated gelatin.

10. The method of making a multilayered therapeutic pellet comprised of an inner core of medicament material and successive layers of medicament material surrounding the core and a layer of gelatin between the core and each successive layer of medicament material to separate them one from the other, said method comprising the successive steps of treating said layers of gelatin to a .5% aqueous-formaldehyde solution, absolute alcohol, a 10% formaldehyde-85% alcohol solution, and then with absolute alcohol to effect protein changes in said gelatin layers to a predicable depth.

11. The method recited in claim 10, in which a quantity of cupric sulphate is added to the absolute alcohol.

12. The method recited in claim 10, with the addition of a layer of untreated gelatin over the outermost layer of medicament material.

13. A multilayered therapeutic pellet comprised of an inner core of medicament material, a shell of gelatin surrounding said core, said shell having the capacity to resist the action of the acid environment of the human stomach, a layer of medicament material surrounding said shell, and an outer coating of gelatin.

14. A therapeutic pellet comprised of a core of medicament material, and a shell of gelatin surrounding said core, said shell being treated in successive steps to a formaldehyde solution and absolute alcohol to render it resistant to the acid environment of the human stomach.

References Cited by the Examiner
UNITED STATES PATENTS

| | | | |
|---|---|---|---|
| 276,385 | 4/1883 | Franciscus | 118—31 |
| 1,419,618 | 6/1922 | Deming | 167—83 |
| 1,815,902 | 7/1931 | Ellzey | 167—83 |
| 2,340,037 | 1/1944 | Zipper | 167—83 |
| 2,491,475 | 12/1949 | Bogin | 167—83 |
| 2,578,943 | 12/1951 | Bird et al. | 18—58 |

JULIAN S. LEVITT, *Primary Examiner.*

GEORGE A. MENTIS, *Assistant Examiner.*